US012763496B2

(12) United States Patent
Gärtner et al.

(10) Patent No.: US 12,763,496 B2
(45) Date of Patent: Oct. 13, 2026

(54) CABLE HOUSING

(71) Applicant: Aptiv Technologies AG, Schaffhausen (CH)

(72) Inventors: Markus Gärtner, Wuppertal (DE); Manoharan Srinivasan, Chennai (IN)

(73) Assignee: Aptiv Technologies AG, Schaffhausen (CH)

( * ) Notice: Subject to any disclaimer, the term of this patent is extended or adjusted under 35 U.S.C. 154(b) by 556 days.

(21) Appl. No.: 18/231,563

(22) Filed: Aug. 8, 2023

(65) Prior Publication Data

US 2025/0047015 A1 Feb. 6, 2025

(30) Foreign Application Priority Data

Aug. 3, 2023 (EP) .................................... 23189510

(51) Int. Cl.

| | |
|---|---|
| ***H01R 4/2433*** | (2018.01) |
| ***H01R 43/01*** | (2006.01) |
| ***H01R 43/02*** | (2006.01) |

(52) U.S. Cl.

CPC ........... *H01R 4/2433* (2013.01); *H01R 43/01* (2013.01); *H01R 43/0207* (2013.01)

(58) Field of Classification Search

None

See application file for complete search history.

(56) References Cited

U.S. PATENT DOCUMENTS

| | | | | |
|---|---|---|---|---|
| 5,549,484 A * | 8/1996 | Chen | H01R 12/515 | 439/417 |
| 5,622,517 A * | 4/1997 | Heng | H01R 4/2433 | 439/417 |
| 6,050,845 A * | 4/2000 | Smalley, Jr. | H01R 12/515 | 439/417 |
| 2016/0197435 A1 | 7/2016 | Kitamura et al. | | |

FOREIGN PATENT DOCUMENTS

WO 2009059335 A1 5/2009

* cited by examiner

*Primary Examiner* — Tho D Ta

(74) *Attorney, Agent, or Firm* — Billion & Armitage

(57) ABSTRACT

The present invention relates to a cable housing, in particular a splice saver, for accommodating two cables. The cable housing includes a cable mounting slot in a wall of the cable housing. The slot comprises a cable-insertion portion configured to receive a cable. The cable-insertion portion comprises a first width. The slot further comprises a cable-retention portion configured to retain the cable by force fit and/or form fit. Moreover, the cable-retention portion comprises a second width which is smaller than the first width. Further, the cable-retention portion comprises a knife edge configured to retain the cable by means of force fit and/or form fit.

14 Claims, 5 Drawing Sheets

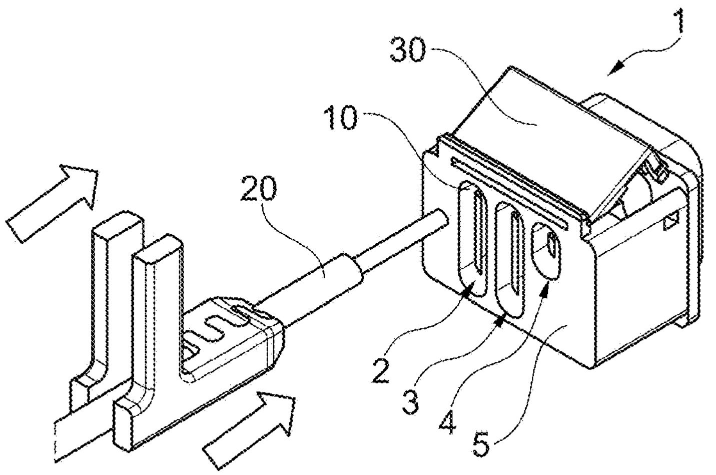
Fig. 5
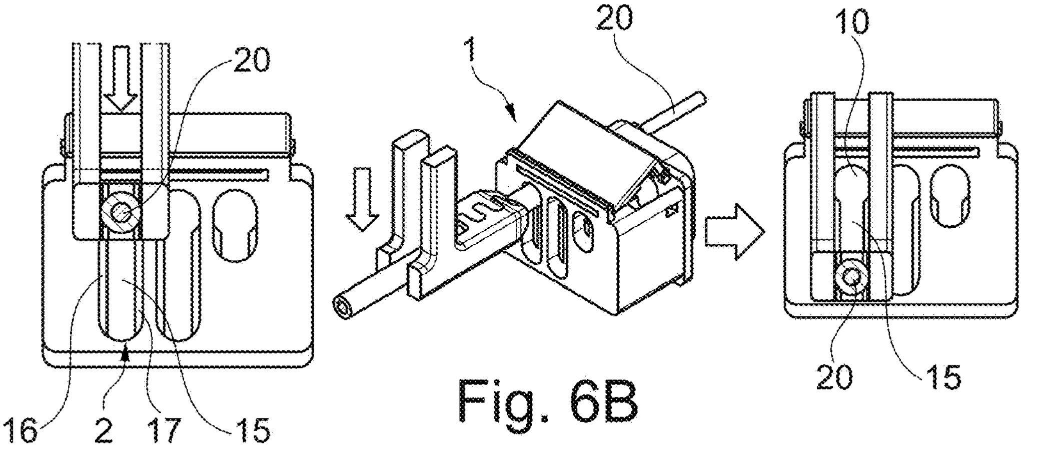
Fig. 6A
Fig. 6B
Fig. 6C
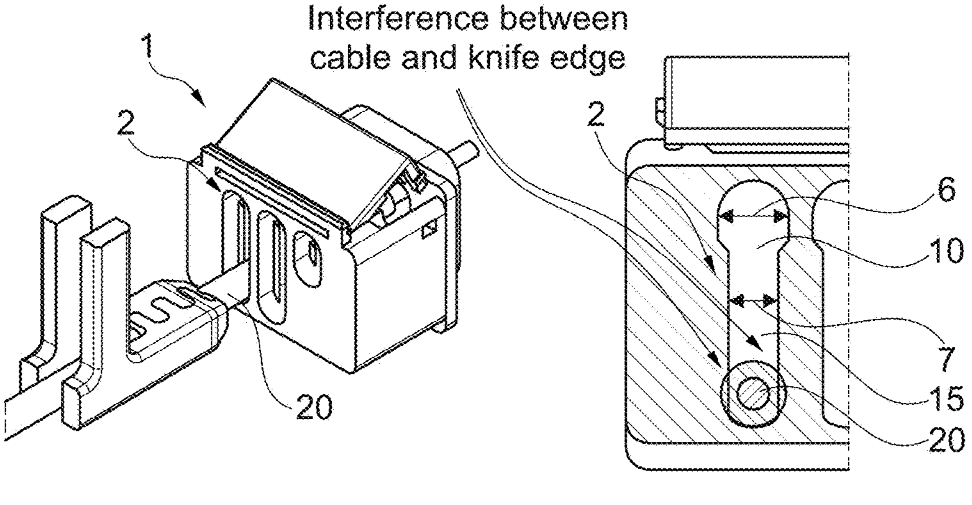
Fig. 7A
Fig. 7B

CABLE HOUSING

CROSS-REFERENCE TO RELATED APPLICATION

This application claims benefit of priority to European Patent Application No. 23189510.3 filed on Aug. 3, 2023, the entire disclosure of which is hereby incorporated by reference.

TECHNICAL FIELD OF THE INVENTION

The present disclosure relates to a cable housing, a cable housing system, and a method for assembling a cable housing system.

BACKGROUND

In modern vehicles, the transmission of electric power and signals is becoming increasingly important. This particularly applies to hybrid and electric vehicles, whose functionality is highly based on a stable supply of electric energy.

To transmit electric power and/or signals to different parts of a vehicle a splicing of cables is regularly required. Exemplarily, a cable may need to be spliced to provide electricity to an electric engine attached to a left wheel of a vehicle and to an electric engine attached to a right wheel of the vehicle.

To provide one or more splices within a single assembly, splice savers which may be also referred to as splice saver connectors and/or splice saver housings are used. Thereby, an example of a splice saver as presently used in the art is illustrated in FIG. 1. The splice saver 4000 is configured to receive a metal busbar 1000 which is configured to connect all the cables 3000 to be mounted. Furthermore, all terminals 3000 that belong to the splice saver 4000 are supposed to be mounted to one housing 2000 to which also the metal busbar 1000 is connected.

First, the aspect that all terminals 3000 that belong to the splice saver 4000 are supposed to be mounted to one terminal 2000 regularly results in production difficulties, is complicated to automize, and/or bears the risk of poor connections which may not withstand the requirements in the automotive sector.

Second, the aspect that for establishing an electric connection between the terminals 3000 an intermediate element, i.e. a metal busbar 1000, is required often leads to poor connections and/or increased resistances.

Third, the provision of the busbar 1000 requires additional manufacturing and processing steps as well as additional material.

Thus, it is an object of the present disclosure to provide a cable housing, a cable housing system, and a method for assembling a cable housing system that overcome the aforementioned drawbacks at least partially.

SUMMARY

A cable housing includes a cable mounting slot in a wall of the housing. It will be understood that the cable mounting slot may be an elongated and narrow opening. Further, the cable mounting slot may extend through the cable housing wall, preferably in a substantially straight manner.

The slot includes a cable-insertion portion configured to receive a cable. The cable-insertion portion has a first width.

Further, the slot includes a cable-retention portion configured to retain the cable by force fit and/or form fit. The cable-retention portion has a second width which is smaller than the first width.

It is understood that the cable may be easily inserted into the cable-insertion portion, when the diameter of the cable is smaller than the first width. Further it is understood that the cable may be easily retained within the cable-retention portion by force fit and/or form fit, when the diameter of the cable is larger than the second width.

By means of the cable-insertion portion and the cable-retention portion an easy insertion and subsequent retention of the cable may be achieved in the cable housing without the necessity to conduct extensive fixation operations and/or providing additional fixation elements.

The two cables which the cable housing is supposed to accommodate, i.e., also the cable mentioned above, may include a conductor material. The conductor material may include one or more of the following: copper, aluminum, a copper-based alloy and/or an aluminum-based alloy. Further, the conductor material may include brass. The two cables may be rigid and/or flexible. Moreover, the two cables may be at least partially surrounded by an isolation. The isolation is preferably removed or removable from a portion of each of the two cables. Particularly, the portions may be prepared so that connecting the two cables by ultrasonically welding them together is possible.

Further, the splice saver which may be also referred to as splice saver connector and/or splice saver housing may be configured for providing one or more splices within a single assembly.

The cable housing may include a fixation device which can be switched between an open state and a closed state. The open state may be referred to as a state where the cable may be inserted and/or removed from the cable housing. The closed state may be referred to as a state where the cable may not be inserted and/or not be removed from the cable housing. The fixation device may be configured to at least partially close the cable-insertion portion when being in the closed state. Moreover, the fixation device is preferably configured to extend into the cable-retention portion when being in the closed state. By extending into the cable-retention portion when being in the closed state, the fixation device may exert a pressure onto a cable being arranged inside the cable-retention portion. The fixation of the cable inside the cable housing may be improved.

Even further preferably the fixation device includes a living hinge. The living hinge may be also referred to as film hinge. A living hinge is defined as a thin flexible hinge made from the same material as the two rigid pieces it connects. Living hinges allow for minimal friction and/or very little wear. Further, they are of low cost and/or ease of manufacturing. The living hinge may be integrally formed with the cable housing and a fixation element which is movable relative to the cable housing. Exemplarily, the living hinge may be integrally formed with the cable housing and the fixation element by means of injection molding. Particularly injection molding allows for a very fast and/or accurate manufacturing. It is understood that the fixation element may be configured to at least partially close the cable-insertion portion when being in the closed state. Moreover, it is understood that the fixation element is preferably configured to extend into the cable-retention portion when being in the closed state.

The fixation device may be configured to press the cable against one end of the slot. The end is preferably on the opposite end of the slot than the cable-insertion portion. By pressing the cable against one end of the slot, the cable may be safely retained within the cable housing. Moreover, a movement of the cable within the slot may be avoided. Wear and tear of the cable and/or the cable housing may thereby be avoided.

The cable-retention portion includes a knife edge configured to retain the cable by means of force fit and/or form fit. Preferably the knife edge is configured for pressing in and/or cutting in the cable. The knife edge may include a polymer and/or a metallic material. Polymers may be preferred due to their outstanding insulative properties and/or easy manufacturing. Particularly, the knife edge may be configured for pressing in and/or cutting in an isolation of the cable. The knife edge may not contact a conductor within the cable, thereby conductive properties may be maintained on a high level. Preferably, the knife edge(s) is (are) integrally formed with the connector housing.

The cable-retention portion may include two knife edges configured to retain the cable by means of force fit and/or form fit. Preferably the two knife edges are substantially parallel and/or define the second width. More preferably, the two knife edges are configured for pressing in and/or cutting in the cable. The two knife edges may include a polymer and/or a metallic material. Polymers may be preferred due to their outstanding insulative properties and/or easy manufacturing, e.g., by means of injection molding. Particularly, the two knife edges may be configured for pressing in and/or cutting in an isolation of the cable. The knife edge may not contact a conductor within the cable, thereby preferred conductive properties may be maintained.

Preferably, the knife edge(s) is (are) integrally formed with the connector housing.

The fixation device may be configured to press the cable towards the knife edge or to press the cable between the two knife edges. A force fit and/or a form fit between the cable and the knife edge or the two knife edges is thereby obtained. Hence, fixation of the cable within the cable housing may be further improved and/or movements of the cable may be avoided or reduced.

The knife edge or the two knife edges may extend along the slot. Hence, the cable which is inserted into the cable-insertion portion and pressed into the cable-retention portion, e.g., by means of the fixation device, may slide along the knife edge or the two knife edges. The cable is fixed in the cable housing when entering the cable-retention portion without the need for further means. Moreover, in the above configuration. The knife edge or the two knife edges extend along the slot it is particularly preferred when two cables are supposed to be inserted into the slot. This is as the cables may then be held back in a row and supported against each other by means of an uncomplicated configuration.

The cable housing may include two slots, preferably three slots. Thus, the cable housing may allow for sufficient space for a number of cables which are required in automotive projects. Further, the above-mentioned fixation device may fixate a cable within each of the slots. Two slots and three slots have proven to be particularly preferred regarding an interaction with the fixation device.

Further, one of the slots is configured to receive two cables, preferably three cables. Slots being configured to receive two cables provide the advantage that the inserted cables may be supported against each other.

The object according to the present invention is further partially achieved by a cable housing system which includes the cable housing as described above, and two cables accommodated in the housing. Since the cable housing system includes the cable housing as described above it is understood that the advantages described above also apply to the cable housing system. Further, aspects which are mentioned above with regards to cables for the cable housing also apply to the cable housing system.

The object according to the present invention is further partially achieved by a method in accordance with claim 11. In particular, by a method for assembling a cable housing system including the following steps:

a) providing a cable housing according to the above description;
b) providing two cables;
c) inserting a cable through a cable-insertion portion of one slot;
d) transferring the cable into a cable-retention portion of the slot, and
e) repeating steps c) and d) with another cable.

Step c) may be conducted in that a gripper of an automatic wire harness assembly machine inserts the cable, which preferably has been cut and stripped in a pre-process, through a cable-insertion portion of one slot.

Step d) may be conducted in that after the gripper has inserted the cable, the gripper mounts the cable in the slot by moving it into the cable-retention portion. The cable may be connected to the cable housing and optionally slightly clamped by the above-described knife edge or two knife edges. Then the gripper may open its jaws and release the cable. The cable is fixed and cannot fall out.

The method may further include the following step after step b), preferably after step e): ultrasonically welding together portions of the two cables. Preferably the portions of the two cables which are welded together were each inserted through the cable housing. The two cables may be welded into a splice and connected together electrically and mechanically.

Moreover, the method may further include the following step: closing the cable housing by switching the fixation device from the open state to the closed state. The fixation device may at least partially close the cable-insertion portion. Thus, no cable may fall out of the cable housing. Moreover, the fixation device may then extend into the cable-retention portion. By extending into the cable-retention portion when being in the closed state, the fixation device may exert a pressure onto a cable being arranged inside the cable-retention portion. The fixation of the cable inside the cable housing may be improved.

Preferably, in all the embodiments disclosed herein, the housing or housing system does not include a metal bus bar.

BRIEF DESCRIPTION OF THE DRAWINGS

The present invention is now described, by way of example with reference to the accompanying drawings, in which:

FIG. 5 illustrates inserting a first cable through a cable-insertion portion of one slot of the cable housing according to some embodiments:

FIGS. 6A through 6C illustrate transferring the first cable into a cable-retention portion of the slot according to some embodiments:

FIGS. 7A and 7B illustrate an interference between the first cable being inserted into the slot and two knife edges within the slot according to some embodiments:

DETAILED DESCRIPTION

A non-limiting example of a cable housing is depicted in FIGS. 2 to 9. This exemplary cable housing 1 is a splice saver that is configured to accommodate up to seven cables. In other embodiments, the cable housing may be configured to accommodate as few as two or more than seven cables. The cable housing 1 includes three cable mounting slots 2, 3, 4 in a wall 5 of the cable housing 1.

Each of the slots 2, 3, 4 includes a cable-insertion portion configured to receive a cable and a cable-retention portion configured to retain the cable by force fit and/or form fit.

Figure 1:
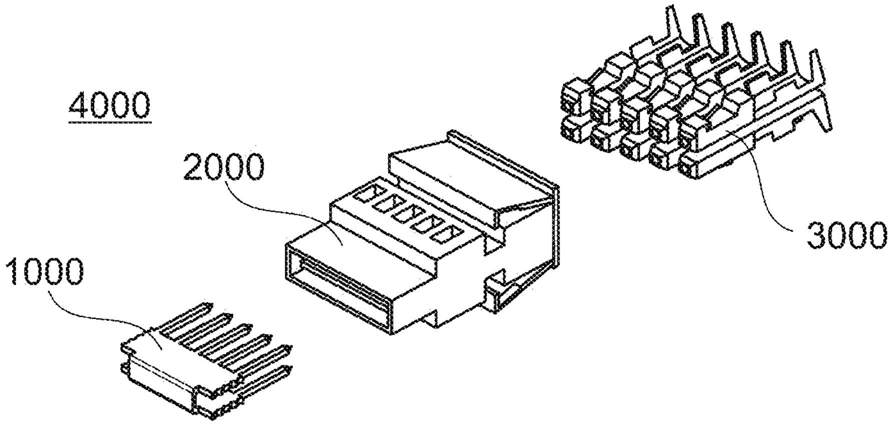
Fig. 1 PRIOR ART
FIG. 1 shows a cable housing according to the prior art.
Figure 2:
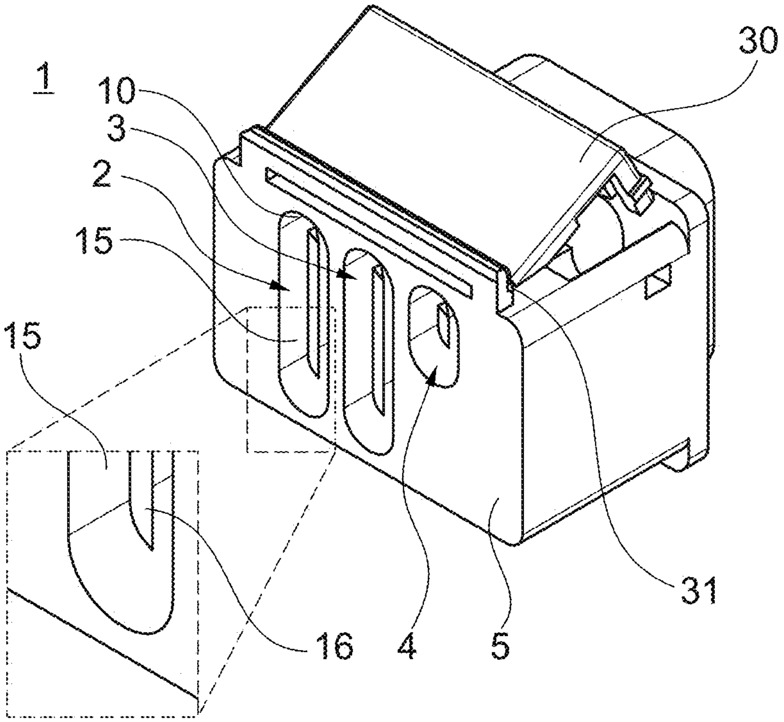
FIG. 2 shows a perspective front view of an exemplary cable housing according to some embodiments.
Figure 3:
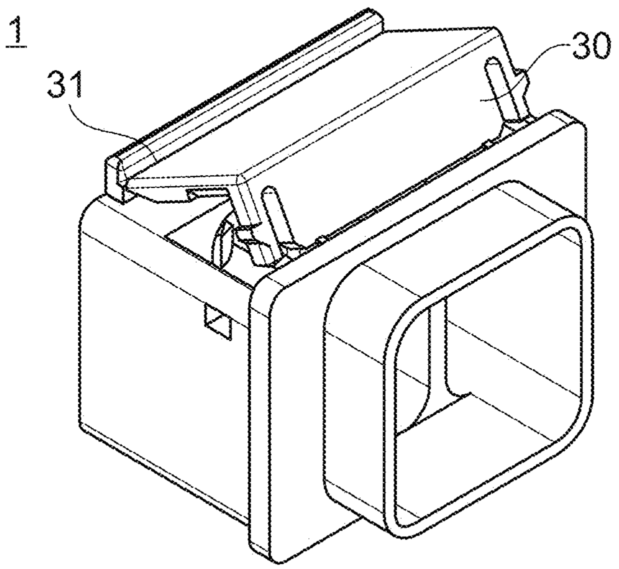
FIG. 3 shows a perspective rear view of the exemplary cable housing according to some embodiments.
Figure 4:
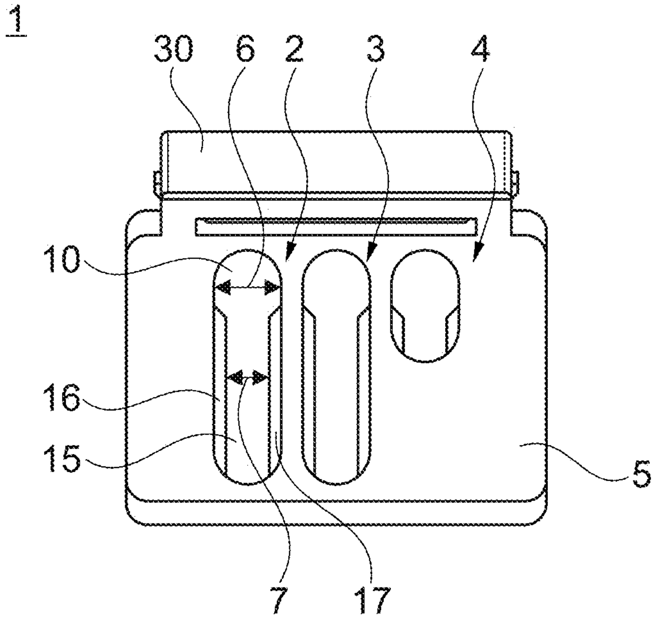
FIG. 4 shows a front view of the exemplary cable housing according to some embodiments.

In FIG. 2 to FIG. 9, the slot 2 is provided with reference signs to describe the specific configuration. Nevertheless, from the Figures it is understood that the further slots 3, 4 include the same configuration, except that slot 4 is configured to receive only one cable. The slot 2 includes a cable-insertion portion 10 configured to receive a cable 20. The cable-insertion portion 10 has a first width 6 (cf. to FIG. 4). The slot 2 further includes a cable-retention portion 15 configured to retain the cable 20 by force fit and/or form fit. The cable-retention portion 15 has a second width 7 which is smaller than the first width 6. The first width 6 and the second width 7 are illustrated in FIG. 4 and FIG. 7.

As depicted in FIG. 2 and FIG. 3, the cable housing 1 includes a fixation device 30 which can be switched between an open state and a closed state. Switching the fixation device 30 from the open state and the closed state is depicted in FIG. 8. As can be further seen in FIG. 8, the fixation device 30 is configured to at least partially close the cable-insertion portion 10 when being in the closed state. The fixation device 30 of the exemplary cable housing 1 includes a living hinge 31. The living hinge 31 is integrally formed with the cable housing 1 and a fixation element which is movable relative to the cable housing 1. As can be particularly seen in FIG. 3, the fixation device 30, i.e., the fixation element being integrally formed with the living hinge 31, includes means which allow for a form fit between the fixation device 30 and an aperture provided in the cable housing.

As shown in FIG. 4, the cable-retention portion 15 of the cable housing 1 includes two knife edges 16, 17 being configured to retain cables 20, 21 by means of force fit and/or form fit. The two knife edges 16, 17 are parallel and define the second width 7. Moreover, as shown in the detail of FIG. 7, the two knife edges 16, 17 are configured for pressing in and/or cutting in cables 20, 21. As can be further seen in FIG. 4, the two knife edges 16 and 17 extend along the slot 2. It is apparent that also in the other slots 3, 4 knife edges as in slot 2 are arranged.

FIG. 5 to FIG. 9 illustrate the automated assembly process of a cable housing system 50 which includes the cable housing 1 and seven cables accommodated in the final cable housing 1. For the sake of clarity, only two cables 20, 21 are provided with reference signs.

FIG. 5 illustrates providing a cable 20 by means of a gripper and a cable housing 1. The cable 20 includes an isolation which is however removed (stripped) at an end of the cable which is to be inserted into the cable housing 1. The gripper preferably is an automated gripper. Further, in FIG. 5 by means of the two bold arrows, inserting 130 the cable 20 through the cable-insertion portion 10 of the slot 2 is illustrated.

FIGS. 6A through 6C illustrate transferring the cable 20 into a cable-retention portion 15 of the slot 2. It is understood that in FIGS. 6A and 6B, the cable 20 is still in the cable-insertion portion 10. Whereas in FIG. 6C, the cable 20 has already been pressed between the two knife edges 16, 17 of the cable-retention portion 15 of the slot 2 by means of the gripper.

In FIGS. 7A and 7B, the state is illustrated when the cable 20 has been moved to an end of the slot 2. This end is opposite to the cable-insertion portion 10. Hence, a final state of the transfer process illustrated in FIG. 6C is shown. In FIGS. 7A and 7B a detailed cross-section of the slot 2 is provided. The plane of the cross-section is in one plane with the knife edges 16, 17. Hence, an interaction between the cable 20, i.e, the isolation of the cable 20, with the two knife edges 16, 17 can be observed. The interaction may be based on force fit and/or form fit. The force fit may result from a pressing-in of the isolation of the cable 20. The form fit may result from a cutting-in of the isolation of the cable 20. A combination is also possible.

Figure 8A:
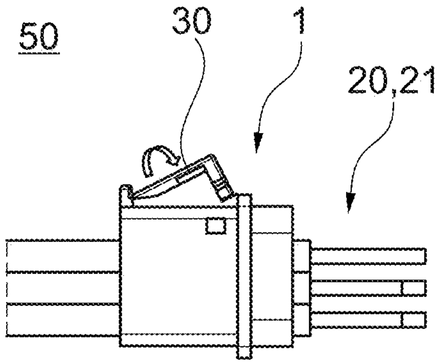
FIGS. 8A and 8B illustrate closing the cable housing by switching the fixation device from the open state to the closed state according to some embodiments.
Figure 8B:
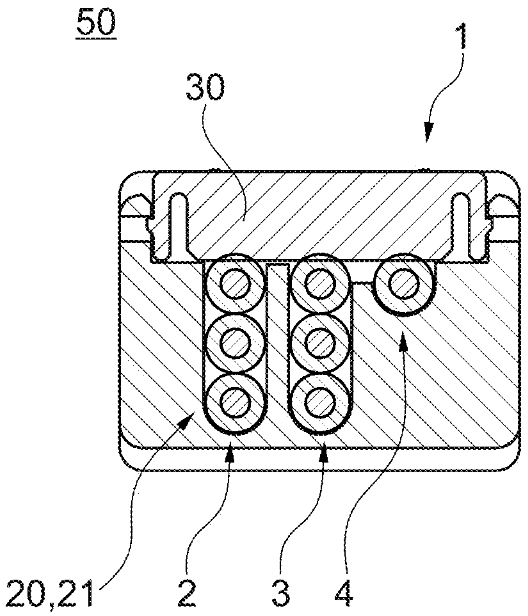

In FIGS. 8A and 8B, switching the fixation device 30 from the open state and the closed state is depicted. A cross-section of the cable housing system 50 is provided which illustrates an interaction of the seven cables with the fixation device 30. In particular, an interaction between the cables being in contact with the fixation device 30 is emphasized with fine arrows. The interaction may be based on force fit and/or form fit. Further, the interaction may result in the fixation device 30 pressing the cables against ends of the slots 2, 3, 4 which are opposite to the cable-insertion portion 10 and the fixation device 30. The fixation device 30 also presses the cables 20, 21 between the two knife edges 16, 17.

Figure 9A:
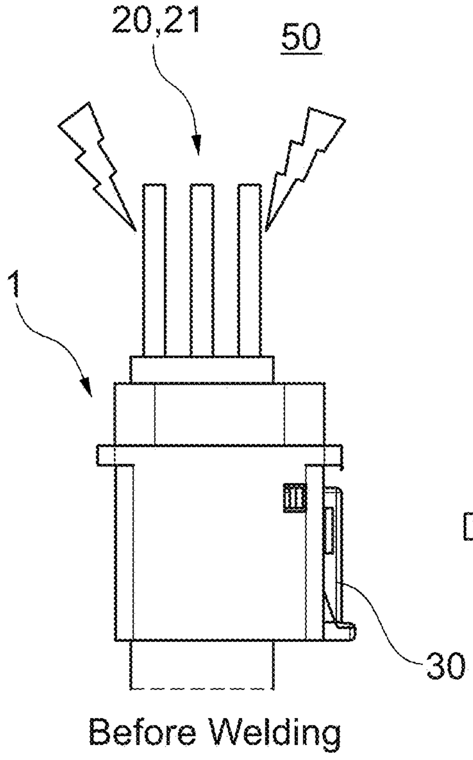
FIGS. 9A and 9B illustrates ultrasonically welding together portions of cables which are arranged in the cable housing according to some embodiments.
Figure 9B:
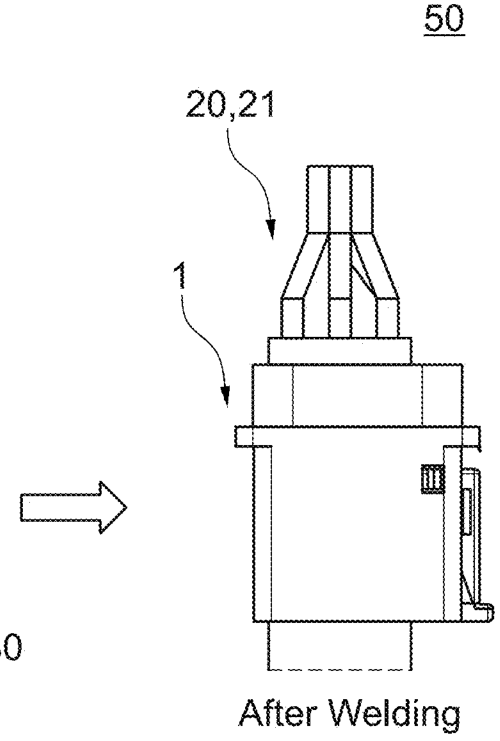

FIGS. 9A and 9B illustrate the step of ultrasonically welding 170 together portions of the cables 20, 21. The portions of the cables 20, 21 which are welded together were each inserted through the cable housing 1.

Figure 10:
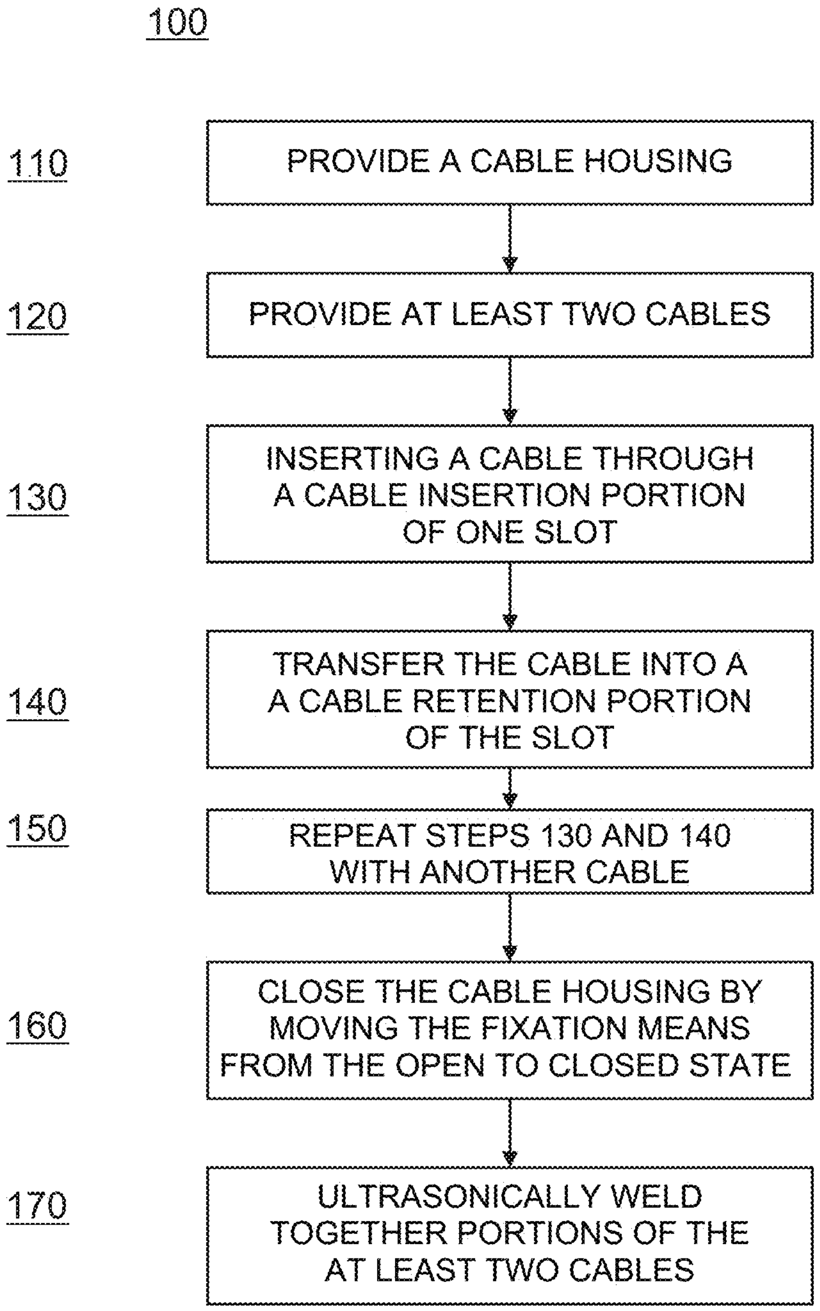
FIG. 10 shows a flow chart of a method for assembling a cable housing system according to some embodiments.

FIG. 10 depicts a flow chart of a method 100 for assembling a cable housing system 50 including the following steps:

a) providing 110 a cable housing 1 according to one of claims 1 to 11;
b) providing 120 two cables 20, 21;
c) inserting 130 a cable 20 through a cable-insertion portion 10 of one slot 2;
d) transferring 140 the cable 20 into a cable-retention portion 15 of the slot 2;
e) repeating 150 steps c) and d) with another cable;
f) closing 160 the cable housing 1 by switching the fixation device 30 from the open state to the closed state, and
g) ultrasonically welding 170 together portions of the two cables 20, 21.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "includes," and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting." depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A cable housing configured to accommodate two cables, comprising:

a cable mounting slot in a wall of the cable housing, wherein the cable mounting slot comprises:

a cable-insertion portion configured to receive a cable, wherein the cable-insertion portion has a first width, and a cable-retention portion configured to retain the cable, wherein the cable-retention portion has a second width which is smaller than the first width, wherein the cable-retention portion includes a knife edge configured to retain the cable by means of force fit or form fit, wherein the cable housing includes a fixation device which can be switched between an open state and a closed state, wherein the fixation device is configured to at least partially close the cable-insertion portion when being in the closed state, wherein the fixation device is configured to extend into the cable-retention portion when being in the closed state, wherein the fixation device includes a living hinge, wherein the living hinge is integrally formed with the cable housing and a fixation element which is movable relative to the cable housing.

2. The cable housing according to claim 1, wherein the knife edge extends along the cable mounting slot.

3. The cable housing according to claim 1, wherein the knife edge is configured for pressing in the cable.

4. The cable housing according to claim 1, wherein the knife edge is configured for cutting in the cable.

5. A cable housing system, comprising:

the cable housing according to claim 1; and two cables accommodated in the cable housing.

6. The cable housing according to claim 1, wherein the fixation device is configured to press the cable against one end of the cable mounting slot.

7. The cable housing according to claim 6, wherein the cable-retention portion includes two knife edges configured to retain the cable by means of force fit and/or form fit and wherein the two knife edges are substantially parallel or define the second width.

8. The cable housing according to claim 7, wherein the fixation device is configured to press the cable towards the knife edge or to press the cable between the two knife edges.

9. The cable housing according to claim 7, wherein the two knife edges extend along the cable mounting slot.

10. The cable housing according to claim 1, wherein the cable housing includes two cable mounting slots.

11. The cable housing according to claim 10, wherein one of the two cable mounting slots is configured to receive two cables.

12. A method for assembling a cable housing system, comprising:

a) providing a cable housing having:

a cable mounting slot in a wall of the cable housing, wherein the cable mounting slot has:

a cable-insertion portion having a first width, and a cable-retention portion having a second width which is smaller than the first width, wherein the cable-retention portion includes a knife edge;

b) providing two cables;

c) inserting a cable through a cable-insertion portion of the cable mounting slot;

d) transferring the cable into a cable-retention portion of the cable mounting slot;

e) repeating steps c) and d) with another cable; and f) stripping a part of an insertion end from the cable or the another cable.

13. The method according to claim 12, wherein the method further comprises:

g) ultrasonically welding together portions of the two cables.

14. The method according to claim 12, wherein the cable housing includes a fixation device which can be switched between an open state and a closed state and wherein the method further comprises:

h) closing the cable housing by switching the fixation device from the open state to the closed state.

* * * * *